Figure 5:
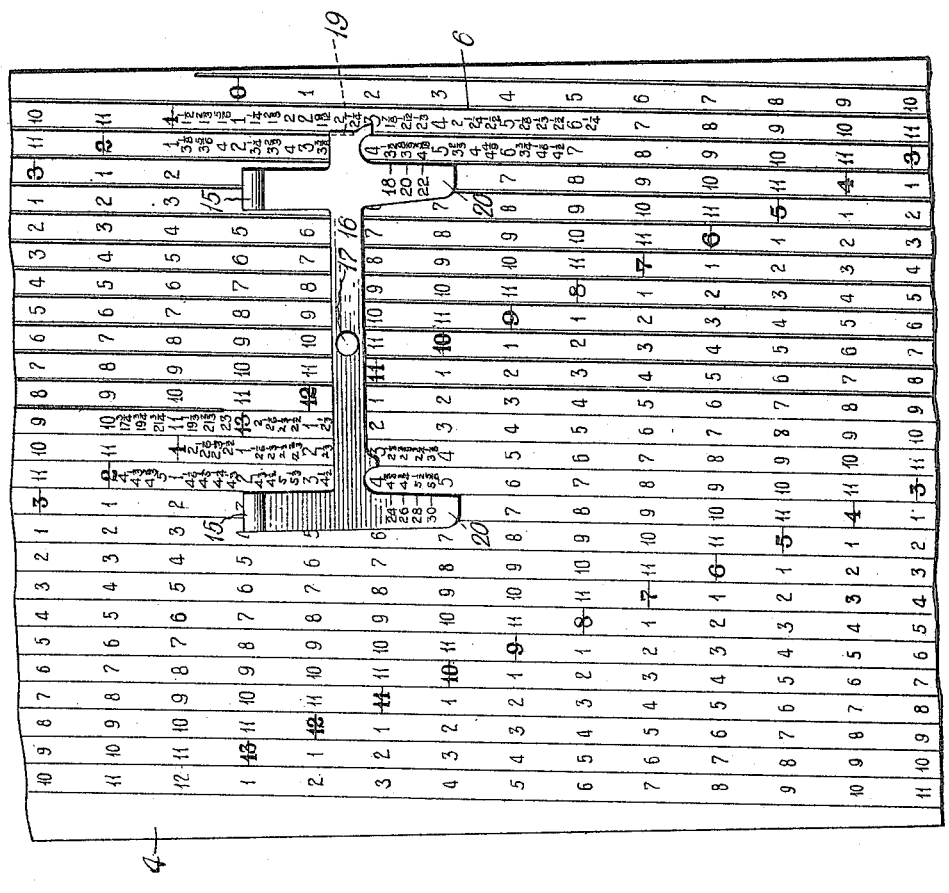

J. G. ALLEN.
WIRE CLOTH MEASURING INSTRUMENT.
APPLICATION FILED MAY 16, 1914.
1,123,649.
Patented Jan. 5, 1915.
3 SHEETS—SHEET 1.
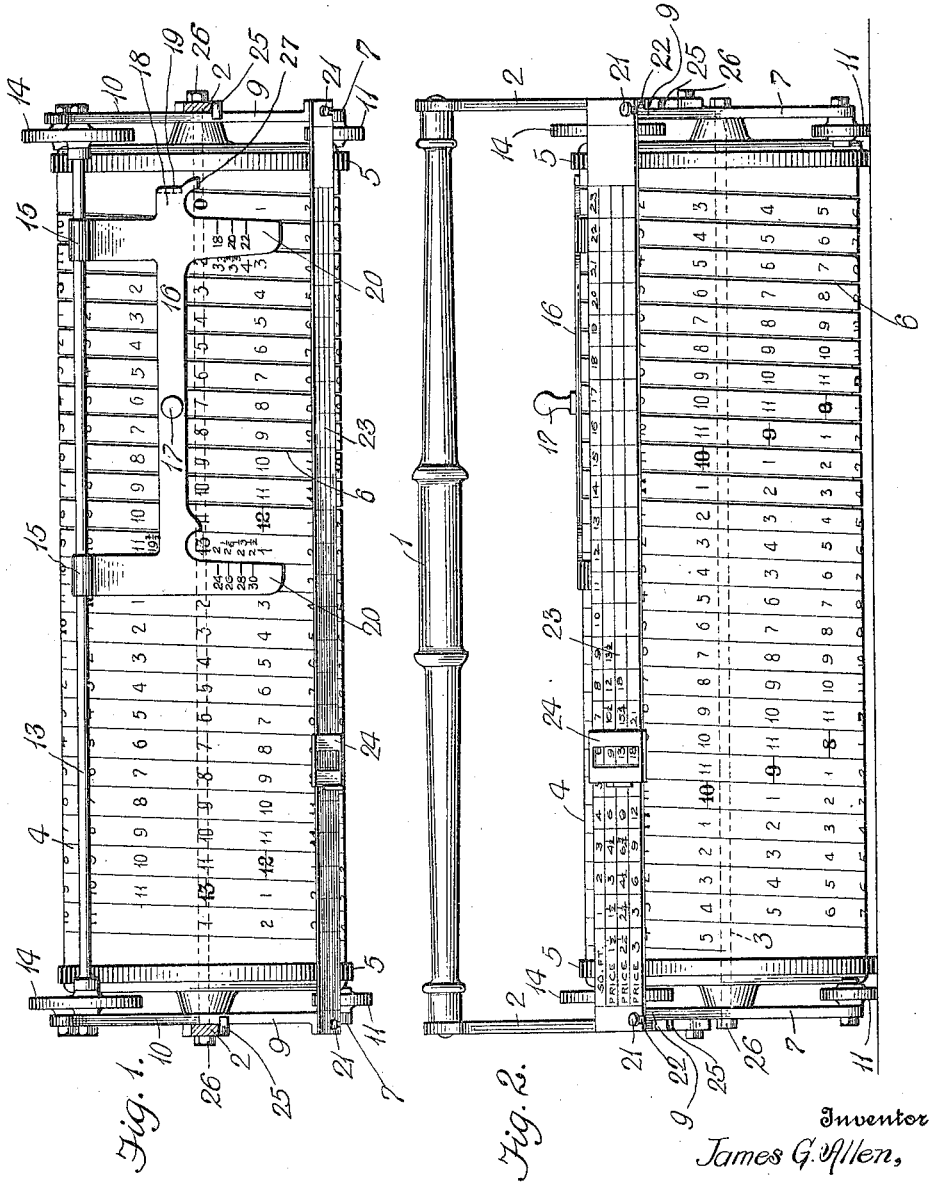
Inventor
James G. Allen, J. G. ALLEN.
WIRE CLOTH MEASURING INSTRUMENT.
APPLICATION FILED MAY 16, 1914.
1,123,649.
Patented Jan. 5, 1915.
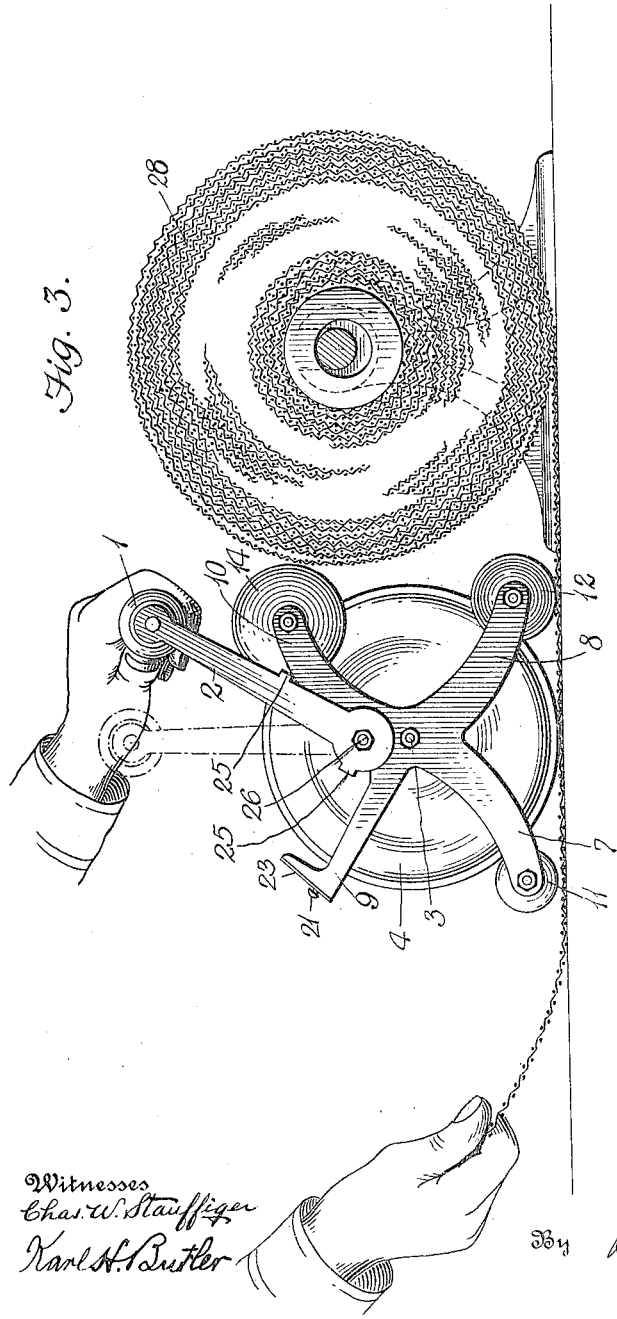
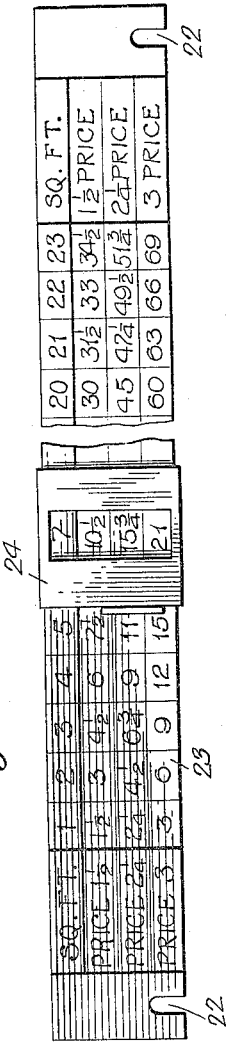

J. G. ALLEN.
WIRE CLOTH MEASURING INSTRUMENT.
APPLICATION FILED MAY 16, 1914.

1,123,649.

Patented Jan. 5, 1915.
3 SHEETS—SHEET 3.

Witnesses
Chas. W. Stauffiger
Karl H. Butler

Inventor
James G. Allen,
By Barthel & Barthel
Attorneys

UNITED STATES PATENT OFFICE.

JAMES G. ALLEN, OF DETROIT, MICHIGAN.

WIRE-CLOTH-MEASURING INSTRUMENT.

1,123,649. Specification of Letters Patent. Patented Jan. 5, 1915.

Application filed May 16, 1914. Serial No. 838,926.

*To all whom it may concern:*

Be it known that I, JAMES G. ALLEN, a citizen of the United States of America, residing at Detroit, in the county of Wayne and State of Michigan, have invented certain new and useful Improvements in Wire-Cloth-Measuring Instruments, of which the following is a specification, reference being had therein to the accompanying drawings.

This invention relates to a wire cloth measuring instrument, and the primary object of my invention is to provide a novel instrument to facilitate measuring and calculating the number of square feet or yards in a piece of wire cloth or similar material.

Another object of this invention is to provide a wire cloth measuring instrument that can be placed in proximity to a roll of wire cloth and held while the cloth is drawn under the instrument, to indicate the length and number of square feet removed from the roll. In using the instrument in this manner it is possible to roll the wire cloth as it is measured and consequently the operation can be performed in a comparatively small space, for instance upon a counter.

A further object of this invention is to provide a wire cloth measuring machine that permits of strips of cloth of various widths being measured to immediately determine, without calculation, the number of square feet in the piece of cloth measured. It is in this connection that the instrument can be quickly used upon a laid-out strip of cloth or any material that can be frictionally engaged by the instrument as the same is rolled or moved over the material.

A still further object of this invention is to provide a simple, durable and inexpensive instrument of the above type having a detachable price scale that permits of the cost of wire cloth per square foot being readily ascertained as soon as the cloth has been measured. The instrument insures precision by avoiding any calculations, mental or otherwise, upon the part of the clerk or person manipulating the instrument.

With the above and other objects in view, the invention resides in the novel construction, combination and arrangement of parts to be hereinafter specifically described and then claimed, and reference will now be had to the drawings, wherein—

Figure 1 is a plan of the instrument partly broken away and partly in section; Fig. 2 is a front elevation of the same; Fig. 3 is a side elevation of the instrument illustrating one manner of using the same; Fig. 4 is an enlarged front elevation of a price scale detached and partly broken away, and Fig. 5 is a developed view of a roller forming part of the instrument.

In describing my invention by aid of the views above referred to, I desire to point out that the same are intended as merely illustrative of an example whereby my invention may be applied in practice, and I do not care to limit myself to the exact construction and arrangement of parts shown. The following description is therefore to be construed broadly as including substitute constructions and arrangements which are the obvious equivalent of those shown.

In the drawings, 3 denotes a spindle and revolubly mounted upon said spindle is a roller 4 having the ends thereof provided with friction treads or tires 5. The roller 4 has a spiral groove or guide way 6 and the convolutions of the groove 6 are equally spaced. The roller is of one diameter throughout and the spaces between the convolutions of the groove 6 are used for certain graduations or calculations, as will hereinafter appear.

Loosely mounted upon the spindle 3, between the side arms 2 and the ends of the roller 4, are end frames having substantially radiating arms 7, 8, 9 and 10, terminating beyond the periphery of the roller. The inner sides of the arms 7 and 8 are provided with revoluble wheels 11 and 12, respectively, the four wheels constituting with the frames a carriage for the roller 4, as will hereinafter appear.

The arms 10 of the end frames are connected by a longitudinally disposed guide rod 13 and revoluble upon said rod at the inner sides of the arms 10, are wheels 14. Pivotally and slidably mounted upon the guide rod 13 are the barrels 15 of an indicating member 16 which has a knob or handle 17 whereby it can be manually shifted upon the guide rod 13. The member 16 is curved to conform to the periphery of the roller 4 and has an extension 18 provided with a depending lug or tongue 19 adapted to extend into the spiral groove 6 of the roller 4. When the roller 4 is revolved the member 16 is moved longitudinally thereof, but can be easily elevated out of engagement with the roller and shifted upon the guide rod 13, which is essential in order that the instrument can be set for proper manipulation after having been used. The member 16 has end portions 20 with edges thereof at an angle in parallelism with or corresponding to the pitch of the convolutions of the spiral groove 6, and these end portions are graduated, as will hereinafter appear.

The outer ends of the arms 9 of the end frames are enlarged and provided with studs 21 for detachably supporting the slotted ends 22 of a price scale 23. The price scale extends longitudinally of the roller 4 and has a shiftable apertured slide or gage 24, which contributes to the accuracy of the instrument when determining the price per square foot of wire cloth or similar material. Pivotally connected to the outer sides of the end frames, as at 26, are the side arms 2 of a bail or handle frame 1, said arms having inwardly projecting lugs 25 that limit the movement of the bail between the arms 9 and 10, consequently the bail or handle frame 1 is maintained in substantially an upright position, convenient for instant use.

Reference will now be had to Fig. 5 of the drawings, showing a developed view of the roller 4 with the indicating member 16 above the same. The roller 4 has been illustrated as having a circumference of twelve inches and the space between the first two convolutions of the groove 6 is designated in inches from zero to eleven inclusive. The space between the second and third convolutions of the groove 6 is designated to indicate the foot of the first convolution and in inches for the second convolution. The third and other convolutions are similarly designated up to thirteen feet and then the designations are started over again for another thirteen feet, and so on, depending upon the length of the roller 4. The second and remaining convolutions are further graduated, between the inch designations, to indicate square feet and fractions thereof.

The indicating member 16 has the end portions 20 thereof provided with width designations, one end portion having such designations as eighteen, twenty and twenty-two, representing in inches, three widths of cloth. The other end portion is designated to represent widths of twenty-four, twenty-six, twenty-eight and thirty inches, and the number of designations upon the end portions of the indicating member simply depend upon the length of said end portions.

To place the instrument in use, it is only necessary to place the same upon a piece of wire cloth to be measured, the width of the cloth being known. As illustrated in Fig. 3, the instrument can be held while the piece of wire cloth is drawn beneath the same from a roll 28 of wire cloth and when in this position, the wheels 14 prevent the roller 4 from contacting with the roll 28. As the wire cloth is drawn beneath the instrument, the roller 4 is revolved and assuming that the pointer 27 of the indicating member 16 has been set at zero, the indicating member 16 is shifted longitudinally of the roller 4 by reason of the tongue or lug 19 extending into the spiral groove 6. The indicating member 16 can be easily observed; and further, assuming that three feet of wire cloth is to be removed from the roll 28, the drawing of the wire cloth beneath the instrument is stopped when the pointer of the indicating member reaches the figure three, as shown in Fig. 5. If the wire cloth is eighteen inches wide, the number of square feet—three and one half—is determined by observing the designation opposite eighteen on the end portion of the indicating member.

Another example. If the cloth is thirty inches wide, the designation opposite the thirty of the indicating member is observed which indicates the number of square feet in a piece of wire cloth three feet long and thirty inches wide. These measurements can be continued for thirteen feet and the number of square feet ascertained in strips of various widths. Should a purchaser desire a strip of greater length than thirteen feet it is necessary to reset the indicating member and start off at zero, but as heretofore suggested, the scope of the measuring instrument is only defined by the length and diameter of the roller 4. After the number of square feet has been ascertained, also the price, which depends upon the grade of cloth, it is only necessary to shift the slide or gage 24 upon the price scale. For instance, seven square feet at one and one half cents per square foot would total ten and one half cents, or at three cents per square foot, a total of twenty-one cents. By using the price scale calculations on the part of a clerk are unnecessary and a desired quantity of wire cloth can be rapidly obtained.

It is through the medium of the sets of wheels 11 and 12 and the end frames that the roller 4 has a carriage which permits of the instrument being moved over and upon a strip of wire cloth, without necessarily guiding or shifting the instrument by hand. For instance with a roll of wire cloth upon the floor, a clerk can place the instrument upon the cloth against the roll and as the cloth is unwound the clerk can roll the same into a roll until a desired length is indicated by the instrument. The wheels 14 prevent the roller 4 from contacting with the roll of cloth and by making the set of wheels 11 of less diameter than the set of wheels 12 or vice versa, the roller 4 will always be actuated by the movement of a piece of wire cloth upon which it rests. This precludes any possibility of the carriage retaining the friction treads or tires 5 of the roller 4 out of engagement with the wire cloth.

From the foregoing it will be observed that I have devised a novel instrument for simultaneously measuring the length of a piece of material and determining the number of square feet in a prescribed length, and that the indicating member of the instrument is automatically actuated whether the instrument be propelled by hand or moved by gravity upon an inclined piece of cloth. The principle involved can be readily embodied in an instrument for determining the number of square feet in a pavement and this is simply one instance of the use to which the instrument may be applied.

What I claim is:

1. A wire cloth measuring machine, comprising a roller having a spiral groove therein, friction treads at the ends of said rollers, end frames supporting said roller and having arms terminating beyond the periphery of said roller, wheels supported by some of the arms and constituting with the frame a carriage for said roller, a guide rod connecting others of said arms, wheels on said rod at the ends thereof adapted to contact the roll of cloth being measured, an indicating member slidable on said rod and curved to conform to the periphery of said roller, a depending lug carried by said member and extending into the groove of said roller and a handle frame carried by said end frame and having a limited movement relative to the arms of said end frames.

2. A wire cloth measuring machine comprising a roller having a spiral groove therein, end frames supporting said roller and having arms terminating beyond the periphery of said roller, wheels supported by some of the frame arms and constituting with the frame a carriage for said roller, a guide rod connecting others of said arms, an indicating member slidable on said rod and curved to conform to the periphery of said roller, a depending lug carried by said member and extending into the groove of said roller, and a handle frame carried by said end frames.

In testimony whereof I affix my signature in presence of two witnesses.

JAMES G. ALLEN.

Witnesses:
ANNA M. DORR,
KARL H. BUTLER.

Copies of this patent may be obtained for five cents each, by addressing the "Commissioner of Patents, Washington, D. C."